Nov. 5, 1963

R. H. McCORMICK 3,109,243

GAUGE FOR MEASURING DIAMETERS AND PITCHES OF HOLES IN BOWLING BALLS

Filed Jan. 25, 1961

INVENTOR.
Rayna H. McCormick
BY
William Cleland
Attorney

Nov. 5, 1963 R. H. McCORMICK 3,109,243

GAUGE FOR MEASURING DIAMETERS AND PITCHES OF HOLES IN BOWLING BALLS

Filed Jan. 25, 1961 3 Sheets-Sheet 2

INVENTOR.
Rayna H. McCormick

BY William Cleland
Attorney

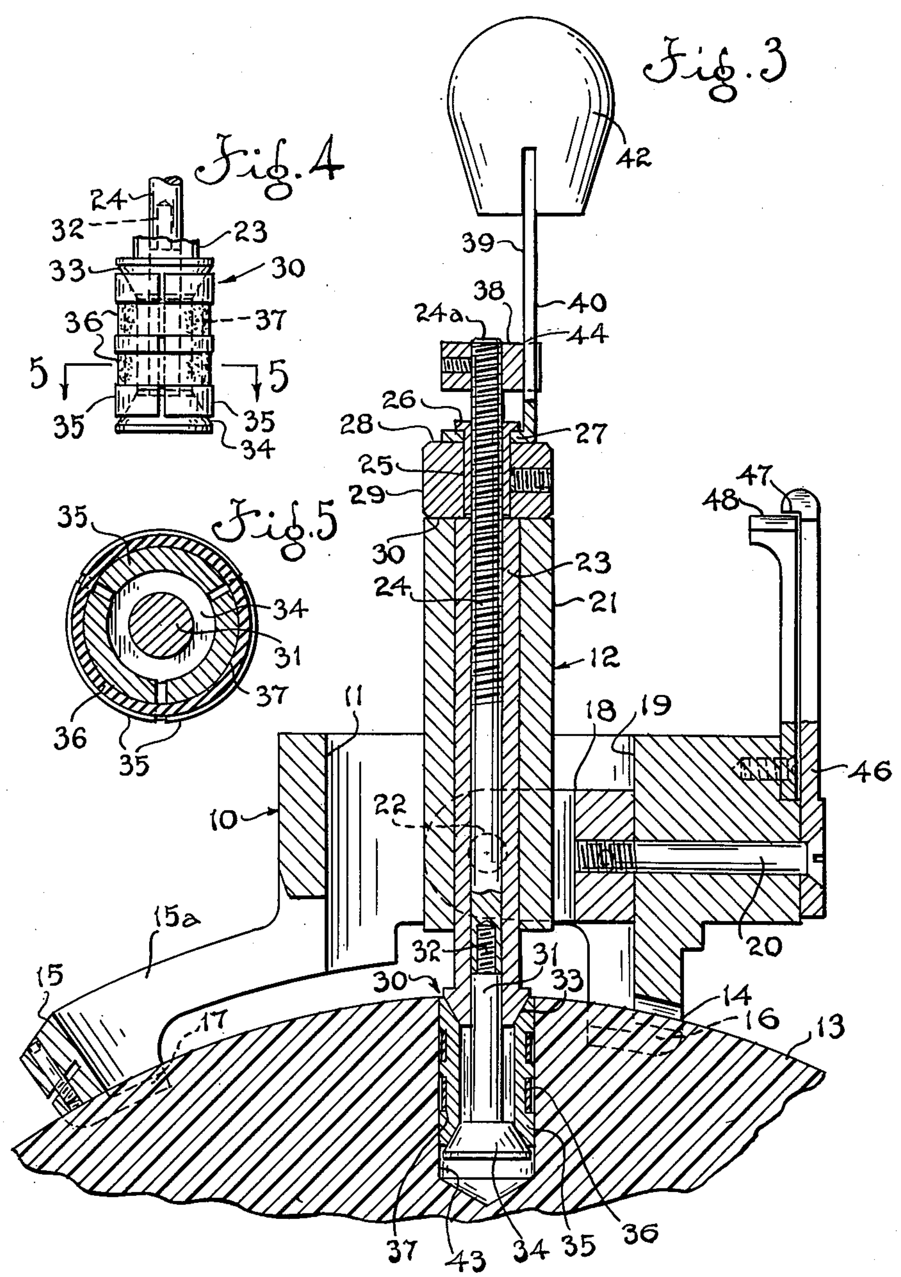
INVENTOR.
Rayna H. McCormick
BY
William Cleland
Attorney

United States Patent Office 3,109,243 Patented Nov. 5, 1963

1

3,109,243
GAUGE FOR MEASURING DIAMETERS AND PITCHES OF HOLES IN BOWLING BALLS

Rayna H. McCormick, Akron, Ohio, assignor to Gil-Mac Machine Company, Akron, Ohio, a corporation of Ohio Filed Jan. 25, 1961, Ser. No. 84,799
13 Claims. (Cl. 33—174)

This invention relates to a gauge for measuring or checking the diameters and the pitches of finger-grip holes in bowling balls or the like.

Bowling balls are provided with either two or three finger-grip holes which are of varying diameters for different individuals. In addition, to obtain maximum gripping qualities in the balls, different individuals require the finger holes to be angled variously with respect to an axis through the hole center at the surface of the ball and through the center of the ball.

Heretofore, devices have been provided for checking hole sizes in bowling balls, and for measuring the hole pitches of the same, but these have required separate units for each operation and were not sufficiently accurate. Moreover, the known devices for measuring pitch were difficult or awkward to operate, and generally required objectionable trial and error adjustments.

One object of the present invention is to provide a gauge of the character described which is easily adjusted to a fixed position on the ball, in cooperation with a finger-grip hole therein, to give a reading of the pitch thereof in any direction or combination of directions.

Another object of the invention is to provide a unitary gauge of the character described which is operable to measure the hole diameter and/or the hole pitch by means of simple fool-proof adjustments.

Other objects of the invention will be manifest from the following brief description and the accompanying drawings.

Of the accompanying drawings:

FIGURE 3 is a vertical cross-section through the gauge, as viewed substantially on the line 3—3 of FIGURE 1, but with the same mounted on a bowling ball to check a finger-grip hole therein.

FIGURE 4 is a fragmentary side view of the hole measuring and gripping collet, as viewed at the lower portion of FIGURE 3.

FIGURE 5 is a horizontal cross-section, taken substantially on the line 5—5 of FIGURE 4.

Figure 1:
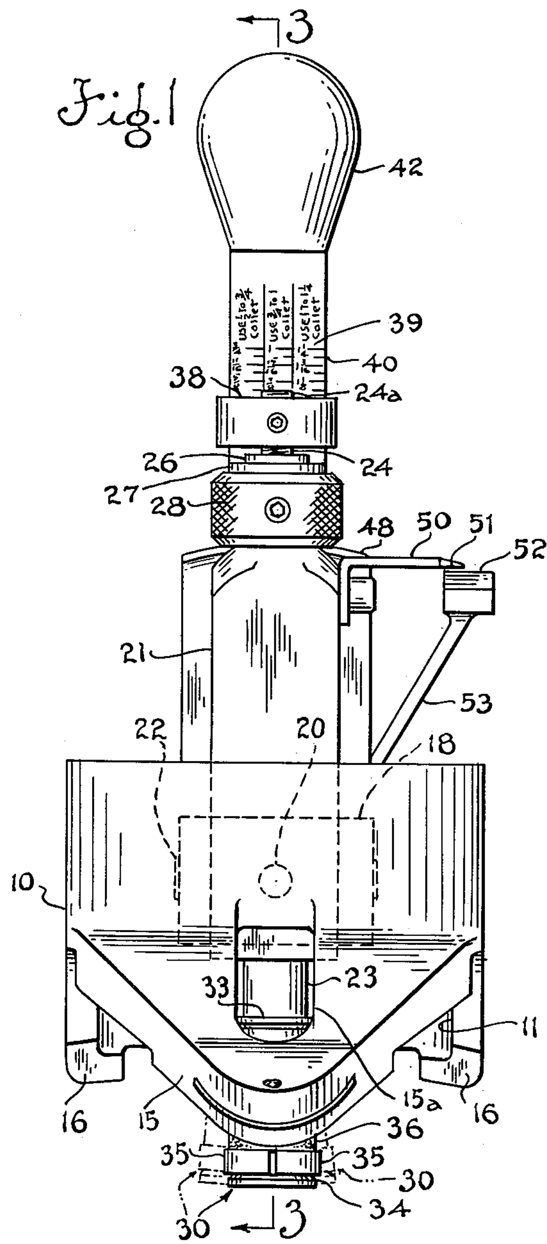
FIGURE 1 is a front elevation of a gauge embodying the features of the invention, in inoperative condition.
Figure 2:
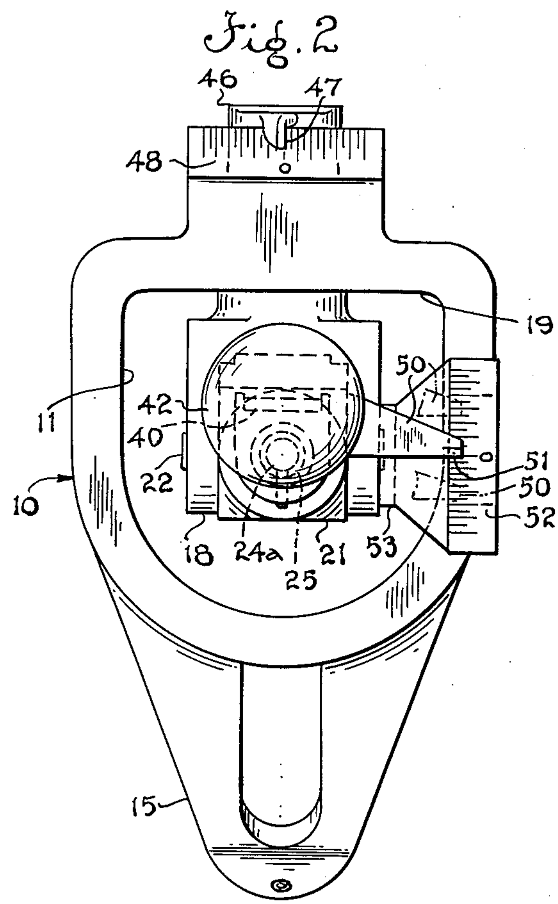
FIGURE 2 is a top plan view thereof.

Referring to FIGURES 1 to 3 of the drawings, the numeral 10 designates a rigid frame or base having an opening 11 vertically therethrough for free reception of a hole gauging unit 12, to be universally adjustable with respect to a bowling ball 13 of standard diameter. For complemental, stable three-point supporting engagement of the base 10 with the ball surface, as shown in FIGURE 3, it may have suitable seat means thereon, including laterally spaced rear feet 14, 14 and a forward extension 15, provided with downwardly presented spherical surfaces 16, 16 and 17, respectively.

The gauging unit 12 may include a clevis 18, mounted on a flat rear wall 19 of the base to pivot with a pin 20 about a transverse horizontal axis, and an elongated sleeve 21 is mounted on said clevis to pivot on a pair of trunnions 22, about a lateral horizontal axis intersecting said transverse axis. Accordingly, the sleeve 21 may be swivelled universally about the two intersecting axes. Rotatably received through square sleeve 21 may be a tubular stem 23, which in turn has a cylindrical rod 24 axially shiftably extending therethrough. The upper end of the

2 rod 24 may have a bushing 25 threaded thereon, the upper end of the bushing having a flanged portion 26 which retains a plate 27 against a flat upper face 28 of a knurled turning knob 29, non-rotatably received on the sleeve 21. A lower face 20 of said knob is normally in relatively rotatable engagement with the upper end of sleeve 21, thereby to support rod 24. The stem 23 is retained in position as shown in FIGURE 5 through a removable split collet unit 30.

Collet unit 30 may include an elongated stud 31, a portion of which extends into the lower end of stem 23, and which has a reduced threaded portion 32 received in a threaded recess in the lower end of rod 24. Stem 31 has a conical head 33 in spaced relation to a conical head 34 integral with stem 23, providing inwardly oppositely converging conical faces which are yieldingly engaged by complemental conical ends of a plurality of segments 35, 35. For this purpose the segments 35 are yieldingly expansibly retained in cylindrical form, as by means of rubber bands 36, 36 received in peripheral grooved portions 37, 37 in the segments to have the outer surfaces of the bands inwardly of the cylindrical surface portions of the segments. The arrangement is such that by turning threaded sleeve 25 on the threaded rod 24, through the knob 29, the rod 24 is vertically axially shiftable to move the conical heads 33 and 34 relatively of each other in axial directions, correspondingly to expand or contract the segments 35.

The amount of radial expansion and contraction of the collet segments 35 may be indexed, in terms of outside diameters of the collet, by provision of a slide bar 38, affixed on an upward extension **24*a* of rod 24, and an upright extension 40 of the plate 27. In other words, upon turning the adjusting knob 29, causing radial expansion of the collet segments 35 to fit snugly against the cylindrical hole 43 of the bowling ball 13, the rod 24 is shifted axially upwardly of sleeve 23. The resultant corresponding movement of the upper edge 44 of the slide 38 will indicate on the scale 39 the expanded outside diameter of the collet, which is also the diameter of hole 43. Plate extension 40 has a knob 42** on the upper end thereof to facilitate operation of the gauge in a manner to be described.

The collet assembly, for example, may include any one of small, medium and large sizes thereof, as required to measure hole diameters ranging from ½ to 1¼ inches. Accordingly, the scale 39 may include three separate scale markings for the respective collet sizes.

In bowling parlance a finger-gripping hole 43 of ball 13 may have "side pitch" in either direction, "forward pitch," or "reverse pitch," or a combination of a forward or reverse pitch with a side pitch.

For measuring "side pitch," an arm 46 affixed on an outward extension of pivot shank 20 has a free edge 47 movable in an arc about the axis of the shank, over an arcuate scale 48 on an upright plate 49 affixed on the base 10. Scale 48 is marked to indicate suitable ranges of "side" pitches from opposite sides of a central zero position (see FIGURE 2), "true pitch" being the distance in inches that the center line of the hole misses the center of the ball. Accordingly, the side pitch dimensions are translated into inches on scale 48 from unit variations in the angles between the actual center line of the hole 43 and an axis passing through the hole center on the surface of the ball and through the center of the ball.

Forward or reverse pitches of a hole 43 are likewise measured in inches, by means of a finger 50 affixed on the stem 21 to extend laterally in parallelism to the axis of trunnions 22, to have a free edge 51 movable in an arc about said axis, over an arcuate scale 52 on an upright 53 affixed on the clevis 18 (see FIGURE 2).

The apparatus described above is used for measuring true pitch of individual holes, such as for the thumb, the middle finger, and the ring finger, as normally provided in three-holed bowling balls.

The gauge is particularly useful for determining hole sizes, spacing, and pitches in a bowling ball to reproduce the same in a new ball, with or without changes, and for checking the requisite sizes, spacing and pitches in newly drilled bowling balls. Accordingly, for checking the thumb-hole 43 in ball 13, for example, the operator firmly seats the base on the ball with the collet 35 loosely inserted in the hole 43, as shown in FIGURE 3, and with a transversely elongated slot 15*a* in the base extension 15 aligned in parallel with a center line extending from the center of the thumb hole and a mid-point between the other two laterally spaced finger holes (not shown). Next, the knob 29 is manually turned to turn nut 25 on rod 24 and thereby to expand the collet 35 to a snug fit in the hole. The resultant proportional movement of the slide 38 will indicate, at the edge 44 thereof, the correct diameter of the hole. At the same time conformance of the expanded collet 34 to the hole will have caused the sleeve 21 to swivel on the two pivotal axes of the clevis 18, correspondingly to indicate the forward or reverse pitch as the case may be, and, at the same time, the side pitch of the hole. FIGURE 2 shows zero pitch readings on the scales 47 and 52. A forward pitch of thumb hole 43, as shown in chain-dotted lines in FIGURE 3 would, however, be indicated at the rear of the zero position on scale 52, as viewed in FIGURE 2. Likewise a side pitch to either side as shown in chain-dotted lines in FIGURE 1, will be indicated on the correspondingly opposite sides of zero on the scale 48. In snugly locating the collet 35 to accommodate the pitch angles of the hole 43 the base 10 is self-adjusting to locate itself to the ball surface.

In other words, by means of one simple setting of the collet 35, with the base firmly seated on the ball surface, direct-readings may be made immediately, and without further adjustments, on the scales 39, 48 and 52 for the diameter, the side pitch and the forward (or reverse) pitch, respectively, of the thumb hole 43. A similar determination may be made of measurements for the middle and ring-finger holes, for which purpose the slot 15*a* would, in each instance, again be aligned in parallelism with the aforesaid center line from the thumb hole center and passing through the mid-point between the laterally spaced finger holes.

In measuring the side pitch of the holes for the middle and ring fingers, the direct readings on the "side pitch" scale 48 will be with reference to a vertical center line extending from a point mid-way between these two holes and passing through the ball center. One example of a conventional grip with no side pitch, might call for a ⅜ inch bridge, a ⅞ inch diameter middle finger hole and a ¾ inch ring finger hole. In such instance, the actual side pitch of the middle finger hole should be ½ the bridge plus ½ the hole diameter, or $\frac{3}{16}$ inch plus $\frac{7}{16}$ inch, which would be ⅝ inch to the left. The actual side pitch of the ring finger hole would be ½ the bridge plus ½ the hole diameter, or $\frac{3}{16}$ inch plus ⅜ inch, which would be $\frac{9}{16}$ inch to the right. In other words, these two results would be directly read on the two pitch scales for "conventional grip with no side pitch."

Thus has been provided a relatively simple and easy to use tool for accurately measuring the diameters and pitches of finger-grip holes in bowling balls. The device takes the usual guesswork out of the task of determining such measurements prior to drilling the holes in new balls, and makes possible a quick, accurate check of the corresponding measurements in newly drilled balls, and thereby reduces damage to balls, heretofore caused by improper drilling and/or checking procedures. The device makes it possible for any individual to determine his exact hole size and hole pitch requirements for drilling a new ball, and to determine accurately if such requirements were fulfilled, whereby the individual will have a finished ball which he can use comfortably and improve his bowling skill accordingly.

Modifications of the invention may be resorted to without departing from the spirit thereof or the scope of the appended claims.

What is claimed is:

1. A gauge for checking measurements of a hole having a peripheral wall in the surface of a bowling ball or like object, comprising a support having an opening therein and provided with seat means for seating the same on the surface of the object over a hole to be measured, a sleeve, swivel means for mounting said sleeve on said support to be universally angularly adjustable in said opening with respect to said support, a stem received in said sleeve, a rod axially shiftably received through said stem, a nut threaded on said rod and having turning means thereon, means for holding said rod against relative rotation with respect to said sleeve, said nut being operable on said rod axially to shift the rod relatively of said stem, an expansible member on said stem adapted to project into said hole and operable by said axial movement of said rod to expand and conform the expansible member to the peripheral wall of the hole, and hole size indexing means operable by said axial movement of said rod relatively of the stem to indicate the size of said hole, the angularity of said expansible member in conforming to said hole determining the angular movement of said sleeve on said swivel means with respect to said support.

2. A gauge as set forth in claim 1, wherein said expansible member includes a cylindrical collet having a plurality of segments which are provided with axially oppositely disposed conical end portions, axially relatively fixed and movable elements on said stem and said rod, respectively, and having axially spaced conical seats complementally engaged by said conical end portions, and means for yieldingly retaining said segments in generally cylindrical shape with said conical end portions in said complemental engagement with said conical seats, said axial movement of said rod thereby being operable to move said elements axially relatively of each other and through said complemental engagement of the conical portions of the segments therewith to change the effective cylindrical size of said collet.

3. A gauge as set forth in claim 1, said hole size indexing means including an upstanding plate rotatably mounted on said nut and having a hole size scale thereon, and a slide member affixed on said rod, said upstanding plate and said slide having interengaging portions preventing relative rotation of the same, and the slide having indicator means for indicating various hole sizes on said scale with said axial movement of the rod.

4. A gauge for checking measurements of a hole having a peripheral wall in the surface of a bowling ball or like object, comprising a support having an opening therein and provided with seat means for seating the same on the surface of the object over a hole to be measured, a sleeve, swivel means for mounting said sleeve on said support to be universally rotatable and angularly adjustable in said opening with respect to said support, a stem received through said sleeve, a rod axially shiftably received through said stem, a nut threaded on said rod and having turning means thereon, means for holding said rod against relative rotation with respect to said sleeve, means for limiting relative axial movement of the nut with respect to said stem, said nut thereby being rotatable on said rod axially to shift the rod relatively of said stem, an expansible member on said stem adapted to project into said hole and operable by said axial movement of said rod to expand and conform the expansible member to the peripheral wall of the hole, size indexing means operable by said axial movement of said rod relatively of the stem to indicate the size of said hole, the angularity of said expansible member in conforming to said hole determining the angular movement of said sleeve on said swivel means with respect to said support, and pitch indexing means for indicating said angular movement of said sleeve with respect to said support and, therefore, the angularity of the hole with respect to the object.

5. A gauge as set forth in claim 4, wherein said expansible member includes a cylindrical collet having a plurality of segments which are provided with axially oppositely disposed conical end portions, axially relatively fixed and movable elements on said stem and said rod, respectively, and having axially spaced conical seats complementally engaged by said conical end portions, and means for yieldingly retaining said segments in generally cylindrical shape with said conical end portions in said complemental engagement with said conical seats, said axial movement of said rod thereby being operable to move said elements axially relatively of each other and through said complemental engagement of the conical portions of the segments therewith to change the effective cylindrical size of said collet.

6. A gauge for checking measurements of a hole having a peripheral wall in the surface of a bowling ball or like object, comprising a support having an opening therein and provided with seat means for seating the same on the surface of the object over a hole to be measured, a sleeve, swivel means for mounting said sleeve on said support to be universally angularly adjustable in said opening with respect to said support, a stem received through said sleeve, a rod axially shiftably received through said stem, a nut threaded on said rod and having turning means thereon, means for holding said rod against relative rotation with respect to said sleeve, means for limiting relative axial movement of the nut with respect to said stem, said nut thereby being rotatable on said rod axially to shift the rod relatively of said stem, an expansible member on said stem adapted to project into said hole and operable by said axial movement of said rod to expand and conform the expansible member to the peripheral wall of the hole, the angularity of said expansible member in conforming to said hole determining the angular movement of said sleeve on said swivel means with respect to said support, and pitch indexing means for indicating said angular movement of said sleeve with respect to said suport and, therefore, the angularity of the hole with respect to the object.

7. A gauge for checking measurements of a hole having a peripheral wall in the surface of a bowling ball or like object, comprising a support having an opening therein and provided with seat means for seating the same on the surface of the object over a hole to be measured, a sleeve, swivel means for mounting said sleeve on said support to be universally angularly adjustable in said opening with respect to said support, said swivel means including element mounted on said support to pivot about a transverse axis and said sleeve being mounted on said element to pivot about a lateral axis at right angles to said transverse axis, a stem received in said sleeve, a rod axially shiftably received through said stem, a nut threaded on said rod and having turning means thereon, means for holding said rod against relative rotation with respect to said sleeve, means for limiting relative axial movement of the nut with respect to said stem, said nut thereby being rotatable on said rod axially to shift the rod relatively of said stem, an expansible member on said stem adapted to project into said hole and operable by said axial movement of said rod to expand and conform the expansible member to the peripheral wall of the hole, the angularity of said expansible member in conforming to said hole determining the angular movement of said sleeve on said swivel means with respect to said support, and pitch indexing means for indicating said angular movement of said sleeve with respect to said support and, therefore, the angularity of the hole with respect to the object.

8. A gauge as set forth in claim 7, wherein said indexing means includes cooperating means on said support and on said element for indicating varations in pivotal movement of the element on the support about said transverse axis, and cooperating means on said element and on said sleeve for indicating variations of pivoted movement of the sleeve on said element about said lateral axis.

9. A gauge as set forth in claim 8, wherein is provided hole size indexing means operable by said axial movement of said rod relatively of said stem to indicate the size of said hole.

10. A gauge as set forth in claim 8, said hole size indexing means including an upstanding plate rotatably mounted on said nut and having a hole size scale thereon, and a slide member affixed on said rod, said upstanding plate and said slide having interengaging portions preventing relative rotation of the same, and the slide having indicator means for indicating various hole sizes on said scale with said axial movement of the rod.

11. A gauge for checking the angularity of a hole in the surface of a bowling ball or like object, comprising a member having means radially expansible to conform to the wall of the hole along a substantial extent axially of the same; a frame; means for adjustably mounting said member on said frame to be swingable in angularly disposed planes about axes therein passing through a center which is relatively fixed with respect to the frame, means operable axially to expand said member to the size and to angularity of said hole and thereby to adjust the member to the angularity of said hole with respect to said surface; said frame having seat means thereon for stable seating engagement with said surface in various positions of adjustment of the frame thereon; angular adjustment of said member in said hole, through said means for adjustably mounting, thereby permitting adjustment of said frame to assume said stable seating engagement with said surface; and indexing means on said member and frame for indicating said angularity of the hole with respect to the surface.

12. A gauge as set forth in claim 11, including means operated by radial expansion of said expansible member to the wall of the hole to indicate the diameter of the same.

13. A gauge as set forth in claim 11, wherein said expansible member includes a generally cylindrical collet having a plurality of segments which are provided with axially oppositely disposed conical end portions, axially relatively movable elements having axially spaced conical seats complementally engaged by said conical end portions, and means for yieldingly retaining said segments in generally cylindrical shape with said conical portions in said complemental engagement with said conical seats, said means to expand being operable to move said elements axially of each other and thereby through said complemental engagement yieldingly axially to move said segments to change the effective cylindrical size of said collet, indexing means being provided for operation by said relative axial movement of said movable elements for indicating the diameter of the hole.

References Cited in the file of this patent

UNITED STATES PATENTS

| | | |
|---|---|---|
| 2,694,261 | Dulligan | Nov. 16, 1954 |
| 2,706,338 | Ackerman | Apr. 19, 1955 |
| 2,787,865 | Gross | Apr. 9, 1957 |
| 2,911,727 | Steinhart | Nov. 10, 1959 |
| 2,930,133 | Thompson | Mar. 29, 1960 |